United States Patent
O'Brien et al.

(10) Patent No.: US 10,477,404 B2
(45) Date of Patent: Nov. 12, 2019

(54) SYSTEM AND METHOD FOR AUTONOMOUS VEHICLE INTRUSION COUNTER-MEASURES

(71) Applicant: Walmart Apollo, LLC, Bentonville, AR (US)

(72) Inventors: John J. O'Brien, Farmington, AR (US); Robert Cantrell, Herndon, VA (US); David Winkle, Bella Vista, AR (US); Todd Mattingly, Bentonville, AR (US); Donald R. High, Noel, MO (US)

(73) Assignee: WALMART APOLO, LLC, Bentonville, AR (US)

( * ) Notice: Subject to any disclaimer, the term of this patent is extended or adjusted under 35 U.S.C. 154(b) by 0 days.

(21) Appl. No.: 16/221,113

(22) Filed: Dec. 14, 2018

(65) Prior Publication Data
US 2019/0191311 A1 Jun. 20, 2019

Related U.S. Application Data

(60) Provisional application No. 62/599,463, filed on Dec. 15, 2017.

(51) Int. Cl.
*H04W 12/12* (2009.01)
*H04W 12/00* (2009.01)
(Continued)

(52) U.S. Cl.
CPC ...... *H04W 12/1204* (2019.01); *G05D 1/0055* (2013.01); *G05D 1/0088* (2013.01);
(Continued)

(58) Field of Classification Search
CPC .............. H04W 12/1204; H04W 4/40; H04W 12/00503; H04W 12/00505; G05D 1/0055; G05D 1/0088; G05D 2201/0213
See application file for complete search history.

(56) References Cited

U.S. PATENT DOCUMENTS 6,842,674 B2 1/2005 Solomon
7,127,334 B2 10/2006 Frink
(Continued)

FOREIGN PATENT DOCUMENTS

CN 107026874 A 8/2017
WO 2014116314 A2 7/2014

OTHER PUBLICATIONS

University of Virginia and the Georgia Institute of Technology, "Cyberwarfare? New System Protects Drones from Hackers", Dec. 2, 2014, pp. 1-4, electronically retrieved from https://www.livescience.com/48961-cybersecurity-for-drones-html, on Sep. 29, 2017.
(Continued)

*Primary Examiner* — Lynn D Feild
*Assistant Examiner* — Jessica J South
(74) *Attorney, Agent, or Firm* — Venable LLP; Jeffri A. Kaminski

(57) ABSTRACT

Systems, methods, and computer-readable storage media for intrusion protection on autonomous vehicles. As threats are detected, the nature of the threat is analyzed. A tiered response to the threat is then implemented, with an ultimate implementation including putting the autonomous vehicle in a "turtle" mode, and intermediate implementations including isolation of various subsystems. As the threats are identified and the autonomous vehicle implements the tiered responses, the autonomous vehicle records data regarding the efficiency the responses in diminishing the threat, then modifies the code which forms the autonomous algorithms such that, over time, the autonomous vehicle improves how it recognizes and responds to threats.

17 Claims, 5 Drawing Sheets

(51) Int. Cl.
*H04W 4/40* (2018.01)
*G05D 1/00* (2006.01)

(52) U.S. Cl.
CPC ....... *H04W 4/40* (2018.02); *H04W 12/00503* (2019.01); *H04W 12/00505* (2019.01); *G05D 2201/0213* (2013.01)

(56) References Cited

U.S. PATENT DOCUMENTS

| | | |
|---|---|---|
| 9,457,915 B2 | 10/2016 | Wang |
| 9,524,648 B1 | 12/2016 | Gopalakrishnan et al. |
| 9,591,004 B2 | 3/2017 | McConnell et al. |
| 9,686,306 B2* | 6/2017 | Chizeck ................ H04L 12/12 |
| 2016/0274912 A1 | 9/2016 | Schoenberger et al. |
| 2017/0069214 A1 | 3/2017 | Dupray et al. |
| 2017/0106986 A1 | 4/2017 | Sweeny et al. |
| 2018/0204469 A1* | 7/2018 | Moster ................. G05D 1/0094 |

OTHER PUBLICATIONS

International Search Report and Written Opinion dated Feb. 25, 2019, issued in corresponding PCT Application No. PCT/US2018/065671.

\* cited by examiner

# SYSTEM AND METHOD FOR AUTONOMOUS VEHICLE INTRUSION COUNTER-MEASURES

PRIORITY

This application claims priority to U.S. Provisional Patent Application No. 62/599,463, filed Dec. 15, 2017, the contents of which are incorporated herein in their entirety.

BACKGROUND

1. Technical Field

The present disclosure relates to counter-measures for intrusions into autonomous vehicles, and more specifically to isolating critical resources when an intrusion attempt is detected.

2. Introduction

Autonomous vehicles, such as drones (aerial and/or ground), robots, self-driving cars, or UAVs (Unmanned Aerial Vehicles) are quickly becoming more prevalent in society. Traditional remote-controlled vehicles or drones have required human pilots, or drivers, to guide the vehicles via RF (Radio Frequency) transmissions. By contrast, autonomous vehicles have sufficient programming to make many navigation decisions without human input.

Despite having sufficient programming to autonomously navigate and travel, autonomous vehicles do require inputs which direct them on where and when to travel, what items to transport or retrieve, identify obstacles or precautions for the planned route, etc. Generally, these inputs are transmitted by a known, "friendly" source. However, in some cases non-friendly parties may attempt to hack, or otherwise perform a remote intrusion, on the autonomous vehicle.

Technical Problem

How to provide counter-measures when an autonomous vehicle is being attacked.

SUMMARY

An exemplary method of providing counter-measures when an autonomous vehicle is being attacked may include: determining, at a processor on the autonomous vehicle, that an intrusion attempt on the autonomous vehicle is being made as the autonomous vehicle is traveling, to yield a determination; isolating, via the processor and in response to the determination, critical functions of the processor; isolating, via the processor and in response to the determination, critical functions of the autonomous vehicle; isolating, via the processor and in response to the determination, critical data stored within a memory device aboard the autonomous vehicle; initiating, via the processor, an autonomous mode for the autonomous vehicle, the autonomous mode ignoring outside communications until a pre-defined condition is met; identifying a safe stopping location; and directing, via the processor in the autonomous mode, the autonomous vehicle to the safe stopping location.

An exemplary system, or autonomous vehicle, configured according to this disclosure may include: a processor; a computer-readable storage medium having instructions stored which, when executed by the processor, cause the processor to perform operations comprising: determining that an intrusion attempt on the autonomous vehicle is being made as the autonomous vehicle is traveling, to yield a determination; isolating, in response to the determination, critical functions of the autonomous vehicle; initiating an autonomous mode for the autonomous vehicle, the autonomous mode ignoring outside communications until a pre-defined condition is met; identifying a safe stopping zone; and directing, while in the autonomous mode, the autonomous vehicle to the safe stopping zone.

An exemplary non-transitory computer-readable storage medium configured according to this disclosure may have instructions stored which, when executed by a computing device, cause the computing device to perform operations comprising: determining that an intrusion attempt on an autonomous vehicle is being made as the autonomous vehicle is traveling, to yield a determination; isolating, in response to the determination, critical functions of the autonomous vehicle; initiating an autonomous mode for the autonomous vehicle, the autonomous mode ignoring outside communications until a pre-defined condition is met; identifying a safe stopping zone; and directing, while in the autonomous mode, the autonomous vehicle to the safe stopping zone.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
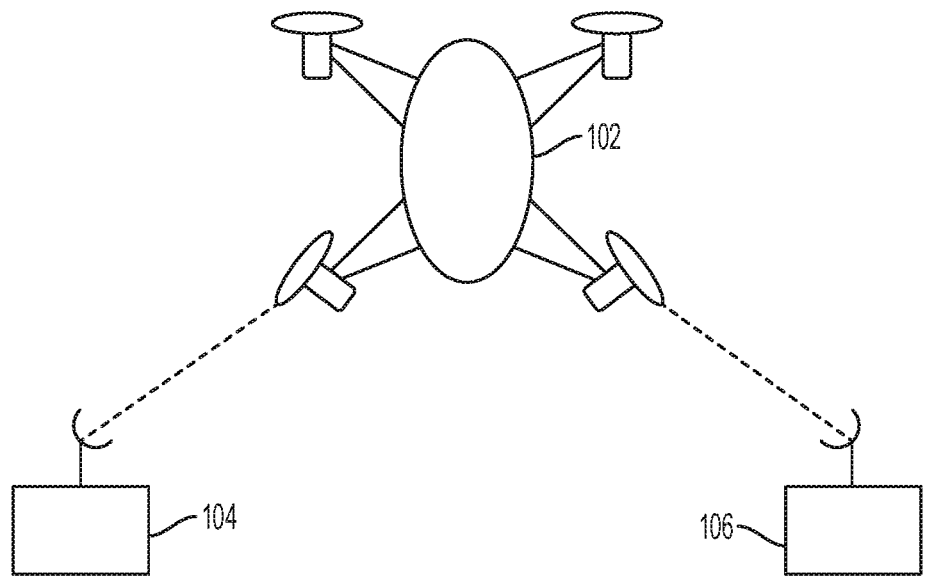
FIG. 1 illustrates an example ground stations communicating with an aerial drone.

Various embodiments of the disclosure are described in detail below. While specific implementations are described, it should be understood that this is done for illustration purposes only. Other components and configurations may be used without parting from the spirit and scope of the disclosure.

As an autonomous vehicle (such as a drone, robot, driverless car, etc.) is moving, the autonomous vehicle may be exposed to various threats. For example, autonomous vehicles may be targeted by attackers seeking to take control of the autonomous vehicle via hacking or other intrusive mechanisms. Likewise, the autonomous vehicle may be subject to a denial of service attack, where an attacker attempts to intercept, impede, spoof, or otherwise disrupt the communication system of the autonomous vehicle. In some cases, the threat may be created by another autonomous vehicle. For example, an unfriendly autonomous vehicle may be used to capture an autonomous vehicle, or otherwise control the autonomous vehicle to perform espionage (where another drone performs reconnaissance on the autonomous vehicle to collect data, record videos, etc., thereby creating an invasion of privacy), deliver malicious payloads, intentionally crash, deploy weapons, steal goods, or otherwise do harm.

As the autonomous vehicle is exposed to various types and degrees of attack, the autonomous vehicles reactions vary based on the type and immediacy of the attack. For example, upon determining a threat exists, the autonomous vehicle may:

- do nothing, and continue with the mission while continuing to observe
- change flight path but generally continue with the mission
- send an alert (i.e., call for help), record images, and transmit log data
- secure critical data/systems
- disregard outside communications for a period of time
- perform evasive maneuvers
- switch to an alternate mission
- seek sanctuary
- land or stop immediately To accurately determine which of these exemplary, non-limiting actions the autonomous vehicle should perform, the autonomous vehicle (1) identifies the threat and (2) determines the best course of action based on the identified threat. This requires the autonomous vehicle to intake sensor data, interpret that sensor data, and/or infer conditions to assess threats. Based on the type of danger or threat identified, the autonomous vehicle can take measured steps to respond to the threat. For example, if the autonomous vehicle detects RF signals which the autonomous vehicle considers to be probing, meaning the signals are attempting to identify how to take control of the autonomous vehicle, the autonomous vehicle can switch to a different channel of communications or switch to a "turtle" mode where all communications are blocked, for example, for a period of time. If the autonomous vehicle detects RF signals which are considered to be actively attempting to control the autonomous vehicle, the autonomous vehicle may isolate critical systems or data, or even pre-emptively shut down, to prevent the autonomous vehicle or the autonomous vehicle's cargo from being captured.

With regard to isolating critical systems or data, aspects of the autonomous vehicle which can be isolated include functions, data, mission information, or sub-systems. In one configuration, the mission critical data (i.e., waypoints, cargo, identification information, delivery times, etc.) can be stored in a database which is isolated when threatening communications are being received. Isolating data stored in a database can occur by limiting (at least for a period of time) which systems have access to the database. Similarly, if there are particular functions which are mission critical, those functions may be isolated (meaning, they are no longer executed on the same processor). To isolate functions, there can be a secondary navigation system which only engages upon detecting threatening actions or communications. The secondary navigation system can, for example, lack communication capabilities with the communication system or other aspects of the autonomous vehicle.

In one configuration, the communication system is physically isolated from the navigation system, meaning that the processor used to analyze and process received communications, then relay those processed communications to other parts of the autonomous vehicle, is a physically distinct processor than the navigation/mission completion processor(s). When received communications are identified as a threat, autonomous vehicles configured in this manner can signal all systems to ignore any signals received from the communication system for a period of time.

The isolation of the communication system, or the isolation of data, functions, or other aspects of the autonomous vehicle, may end when other conditions are met/identified (that is, in ways other than the expiration of the period of time). For example, if the threatening communications are isolated to a specific geographic region or area, such isolation of the communication system signals may end upon the autonomous vehicle moving outside that specific geographic region. Likewise, if the threatening communications were identified as being received from another mobile vehicle (another drone, an aircraft, a ground-based vehicle, etc.), the isolation of the communication system may terminate upon identifying, through a distinct system, that the other mobile vehicle is beyond a communication range, or no longer communicating. In such circumstances, the isolation of the communication system may end, despite the pre-determined period of time not having transpired.

In some configurations, an isolated navigation system may need to navigate to a safe stopping zone (in the case of an aerial autonomous vehicle, a safe landing zone). In such a configuration, one option is for the isolated navigation system to (A) cease communications with other subsystems, and (B) rely solely upon data/information contained within the isolated navigation system. In such a system, access between the isolated navigation system and the exterior sensors, shared/common geographic databases, and other subsystems would be cut off, so the isolated navigation system would rely self-contained sensors, databases, etc., in continuing the mission, finding a safe stopping location, or otherwise proceeding. Another possible configuration which allows the isolated navigation system to safely navigate to a stopping zone has the secondary navigation system separated from the communication subsystem and the primary navigation processor, but still able to access a geographic database and exterior sensors (or a sub-set of the exterior sensors).

The determination to isolate the secondary navigation system, or to take other counter-measures, can be built into the autonomous behavior of the autonomous vehicle. Based on the effectiveness of the isolation and/or other counter-measures, the autonomous vehicle can modify its autonomous behavior for future iterations. More specifically, the autonomous vehicle can record the effectiveness of the isolation and/or other counter-measures on preventing the unfriendly activity from successfully interfering with the autonomous vehicle's mission. Based on the recorded effectiveness, the autonomous vehicle can generate new code, or weights for existing code, which is applied to the counter-measure algorithms in future iterations, such that the detection of threats, the type of counter-measure, the timing of a counter-measure, etc., is modified in that future iteration. Additional examples of how the autonomous vehicle can modify and protect itself on a software level can include: an intelligent algorithm and catalog of rules for processing threats and responses; autonomous learning to improve rules and responses; integration and communication with a central computer to improve rules and responses, protected boot software, security keys, and hashing key portions of a data configuration to identify changed settings.

The iterative analysis can apply rule-based or machine learning to a process of (1) identifying threats, (2) evaluating threats, (3) responding to threats, and (4) repeating the process. Based on the rule-based/machine learning, the threat level and/or criteria for identifying threats may change between iterations. In order to assign a level or value, the system uses a first "baseline" plan which identifies what needs to be protected and what the impact will be if those respective components are damaged or lost. The system can be configured with a catalog of these components organized according to operational need and/or function. Based on how the system is responding to received threats, the corresponding threat criteria and responses can be dynamically adjusted, based on the rule-based/machine learning. Likewise, historical data and/or correlations may be used to adjust the criteria or threat levels. For example, by leveraging historical data, encountering the same intrusion characteristics in the same location might raise the threat level or otherwise indicate an expedited response. In another example, upon seeing a particular response as ineffective, an alternate threat level or response may be selected for future iterations.

While in some configurations, such modifications to the code used to perform the autonomous behavior of the autonomous vehicle is self-contained aboard the autonomous vehicle being modified, in other configurations the process of gathering effectiveness data, generating a modified counter-measure algorithm, and uploading the modified counter-measure algorithm is performed across multiple autonomous vehicles. For example, when an autonomous vehicle "returns-to-home," checks in, or otherwise connects with the management system, the autonomous vehicle can upload data regarding recent threats and the effectiveness of recently deployed counter-measures to those threats. This data can be aggregated from multiple automated vehicles and analyzed by a central server to identify find best practices, possible improvements, weaknesses, etc., which the central server then uses to generate updated autonomous vehicle counter-measure code. The updated autonomous vehicle counter-measure code is then transmitted to one or more of the autonomous vehicles for testing and implementation. In some instances, the updated autonomous vehicle counter-measure code transmitted to one autonomous vehicle may be distinct from that transmitted to another autonomous vehicle so that the central server can compare the results and determine which code is most effective for specific scenarios or circumstances.

To deter RF threats, an autonomous vehicle can require periodic transmissions of a time varying code (similar to an "RSA token" or other secure identification) be sent to the autonomous vehicle from a communicating entity, or likewise can periodically transmit a time varying code to a central server or other entity. These periodic, encrypted communications can form a virtual "heartbeat" of the autonomous vehicle, allowing both the autonomous vehicle and the controlling entities know respective statuses. These heartbeat communications (which may, in some configurations, be performed without a time-varying code), allow each respective system (the autonomous vehicle and the controlling entity) to know the relative health of the other system.

Known threats and responses can be maintained in a catalog, or database, which may be maintained aboard the autonomous vehicle or at a central server to which the autonomous vehicle maintains communications. The catalog can include criteria for various rules, conditions, metrics, states, patterns, events, or sequences of events, which the autonomous vehicle may encounter. These can be based on experiences of the autonomous vehicle and/or on the experiences of other autonomous vehicles similar to the respective autonomous vehicle. Threats may be categorized or labeled according to business, operating, and/or processing needs. Threat criteria may comprise one or more factors. The factors stored within the database may be static references, actively sensed data, programmatically communicated, algorithmically determined, or be various states, and/or characteristics the autonomous vehicle is capable of measuring or otherwise acquiring. Outcomes may be assigned an appropriate level or value. There may also be a set of generalized rules to autonomously accommodate unanticipated cases, combinations, and/or situations. Rules may be further weighted by categorization to enhance autonomous processing.

With the understanding that specific criteria, results, or corresponding threat levels may vary based on specific needs and configuration, consider the following exemplary rules:

(1) Discrete measurable values, events or states do, or do not, meet criteria and are directly mapped and assigned a threat level. Examples:
   a. Criteria: RSSI (Relative Received Signal Strength) falls below 90
     Result: Threat level 1
   b. Criteria: SNIR (Signal to Noise plus Interference Ratio) falls below 7 dB
     Result: Threat level 1
   c. Criteria: 10 or more consecutive failed authentication attempts
     Result: Threat level 2
   d. Criteria: Number of packets received during an interval is higher than expected peak
     Result: Threat level 1
   e. Criteria: TCP (Transmission Control Protocol) connection detected from source no on list of "trusted" IP addresses (networking)
     Result: Threat level 2
   d. Criteria: The gyroscope detects a momentary tilt of 45 degrees with no other observable problems
     Result: Threat level 1
   e. Criteria: The security sensor has been tripped, indicating unauthorized opening of the physical access cover to the processor
     Result: Threat level 3

(2) A combination of values or states exceed criteria, resulting in assigned threat levels. Examples
   a. Criteria: (i) A number of packets received during an interval exceeds a predetermined number and (ii) the number of active TCP connections is higher than normal peak
     Result: Threat level 1
   b. Criteria: (i) The gyroscope detects a momentary tilt of 20 or more degrees and (ii) the accelerometer detects an impact event (free-fall drop versus tap detection)
     Result: Threat level 3
   c. Criteria: Any two or more concurrent conditions of different categories meeting threat level 1
     Result: Threat level 2
   d. Criteria: Any two or more concurrent conditions meeting threat level 2
     Result: Threat level 3
   e. Criteria: (i) The number of active TCP connections is higher than normal-average and (ii) an active TCP connection is found to exist on an unexpected TCP port indicating unauthorized system access
     Result: Threat level 3 f. Criteria: (i) The package sensor detects extra weight and (ii) the gyroscope detects sudden change in tilt, indicating the package may be at risk of theft
Result: Threat level 2

(3) A pattern, flow of data processed by an algorithm or a sequence of events. Examples:
  a. Upon booting from secure storage, the GPS location is unexpected and the security hash value no longer matches, attempts to contact the central computer also fail, the combination of triggers and failed checks indicating possible off-site tampering
  Result: Threat level 3, go to lock-down
  b. Using range finder and/or image analysis, vector analysis and/or other sensors, the vehicle determines another vehicle's is on a direct intercept course but there are no planned vehicle interactions
  Result: Threat level 1
  c. After changing course several times to eliminate coincidental activity, a pattern of behavior showing intent to intercept is clear
  Result: Threat level 3
  d. Gyroscope detects three or more 30 degree changes in tilt in a 30 second interval
  Result: Threat level 3
  e. Accelerometer detects a drop-level impact following which the camera no longer responds following which the package sensor detects loss of package
  Result: Threat level 3

Signal criteria may vary from system to system, or based on technology. Exemplary signal criteria may be as follows:

TABLE 1

|  | RSSI | SINR (dB) | RSRQ (dB) | RSRP (dBm) |
| --- | --- | --- | --- | --- |
| Good | >−65 | >12 | >−5 | >−84 |
| Bad | <−90 | <7 | <−10 | <−110 |

RSSI—Received Signal Strength Indicator
SINR—Signal to Interference + Noise Ratio
RSRQ—Reference Signal Received Quality
RSRP—Reference Signal Received Power Testing may be performed to determine the signal criteria identified in Table 1, which may result in distinct values for specific configurations. For example, if all available channels and towers fall into the "bad" range, or if these conditions persist, then a potentially higher threat level exists. Similarly, if this signal or pattern has been seen in this location before, the result may be an expedited response, as well as further modification of the rules to preempt risk for this situation.

The various sub-systems which together form the autonomous vehicle can include combinations of hardware and software. Exemplary sub-systems can include Technology sub-systems (such as the physical structure of the autonomous vehicle), Operational sub-systems (processing systems to operate the physical structure), and Strategic sub-systems (components required to perform a specific mission or task). The threats identified can receive a threat level based on the sub-system they are affecting. For example, threats to technology sub-systems can result in a "Threat Level 1." Threats to operational sub-systems can result in a "Threat Level 2," and threats to strategic sub-systems can result in a "Threat Level 3." Moreover, the threat level assigned can be based on the resulting operations cost, opportunity cost, cost of goods, cost of assets, etc. For example, a loss of time, consumable resources, or simply extra battery power to navigate around obstacles, may result in a higher operating cost, and therefore a "Threat Level 1." A loss of mission, failure to accomplish a goal, or simply unable to collect metrics may result in a lost opportunity cost and therefore a "Threat level 1." A loss of product, material, or goods may result in an increased cost of goods and therefore a "Treat level 2." A loss of vehicle, systems, tools, or components may result in an increased cost of assets and therefore a "Threat level 2." A loss of safety, regulatory, reputation, branding, or broad customer satisfaction may disable or inhibit business, lower revenue, and/or incur penalties, resulting in a "Threat level 3." Again, these examples may change based on specific needs or configuration.

Similarly, in some configurations, each tier of the threat level can be associated with types of threats and corresponding reactions. Consider the following examples. If no threat is detected, no response is required.

The tier 1 threshold can identify potential, but unconfirmed threats. At this level, the potential threat or activity may reduce efficiency or interfere with operation, but may or may not be an intentional attack. Unintentional threats can include proximate obstacles, ambient signals, areas of high signal utilization, and/or signal loss due to obstacle attenuation. Passive counter-measures can be applied as a response. Examples of passive counter-measures can include observing and reporting on the threat, changing signal channels, and/or modifying flight (or route) plans but generally continue with the mission. The system can also attempt to analyze whether an intentional attack is in progress.

At tier 2, a problem exists and has been identified, such that an intentional attack is believed to be in progress. The resulting action is to implement active counter-measures. One or more counter-measure tasks can be initiated which may be concurrent to, or temporarily supersede, the original task.

At tier 3, the problem has escalated, and the threat is likely to result in intrusion or has already caused some loss of control. At this point, it may no longer be possible to continue the original task until the threat is remediated. One or more capabilities may have or will become disabled, and the mission, control, data, and/or package may have (or will be) compromised. Example actions to be taken at this point can include disregarding outside communications for a period of time, seeking sanctuary, landing or stopping immediately, canceling the mission, ensuring safety, and/or logging or recording damages.

FIG. 1 illustrates an example of ground stations communicating with an unmanned vehicle which is an aerial drone 102. In other configurations, the unmanned vehicle can be a driverless car, a delivery robot, a warehouse robot, or any other type of vehicle configured to move without human guidance. In this example, the aerial drone 102 is receiving signals from two distinct ground stations 104, 106. However, it may be that one of the ground stations 104, 106 is not operating with friendly intentions, and may be attempting to take control of (or otherwise harm) the aerial drone 102.

Figure 2:
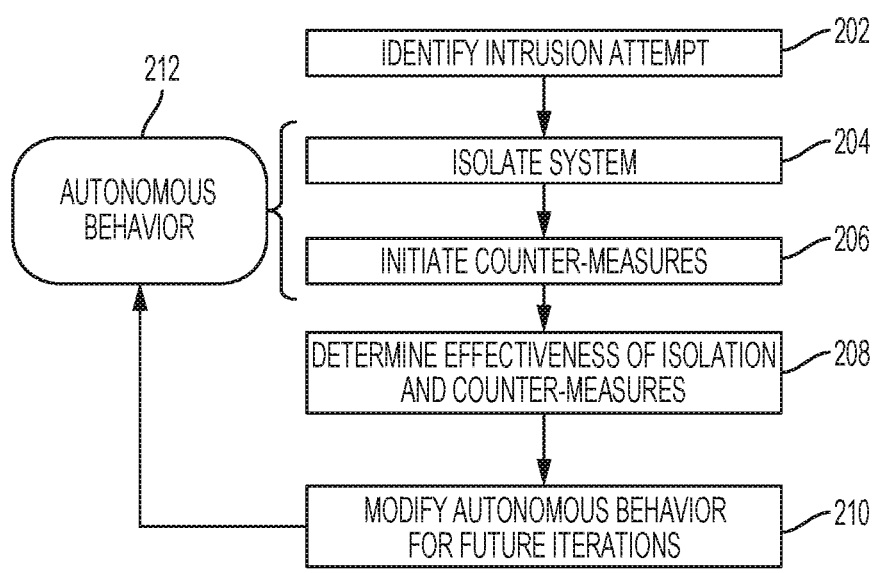
FIG. 2 illustrates a feedback loop for deploying, and iteratively improving, autonomous counter-measures.

FIG. 2 illustrates a feedback loop for deploying, and iteratively improving, autonomous counter-measures. In this example, the detected threat is an intrusion attempt 202, while in other instances the detected threat may be a physical threat, a data theft, an attempt to upload false instructions/directions into the autonomous vehicle, or other types of threat. As the threat is identified 202, the autonomous vehicle can isolate any system 204 or data deemed critical to prevent (or at least attempt preventing) the threat from succeeding. These autonomous reactions 212 can further include the initiation of counter-measures 206, which can further include turtling, shutting down the autonomous vehicle, searching for a nearby stopping zone, etc. The autonomous vehicle (or a central server) then determines the effectiveness of the isolation and counter-measures 208 in diminishing or withstanding the threat. Based on the effectiveness, the code for the autonomous behavior of the autonomous vehicle is modified 210. The modified code allows the autonomous vehicle to behave differently, detect threats differently, and/or adjust differently, in future iterations. Through these mechanisms, the algorithms used to automate the vehicle are modified and improved over time.

Figure 3:
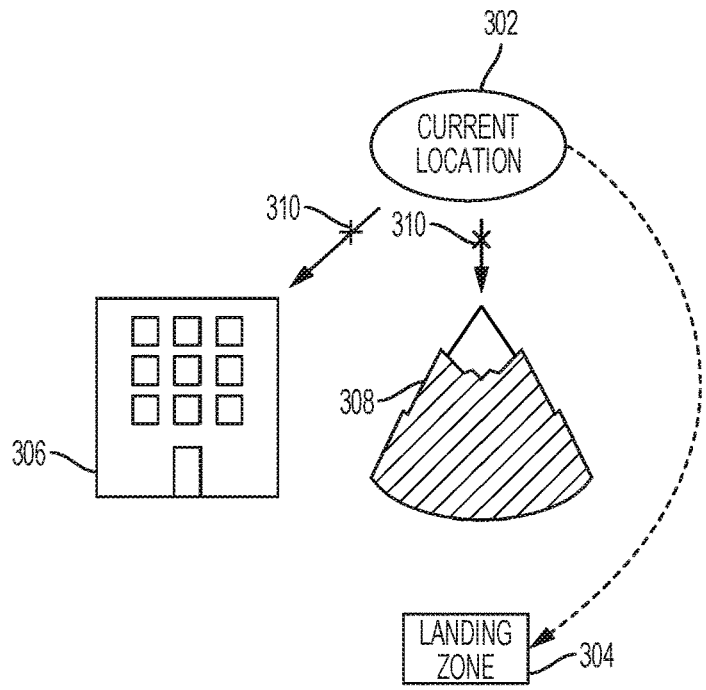
FIG. 3 illustrates an example of an autonomous vehicle navigating to a landing zone in response to an intrusion attempt.

FIG. 3 illustrates an example of an autonomous vehicle navigating to a landing zone (or a stopping zone) in response to an intrusion attempt, where the autonomous vehicle can stop and wait for retrieval. In the case of a ground-based drone, the stopping zone can be a safe place to park, whereas for an aerial drone, a safe landing zone is sought. In a preferred circumstance, the autonomous vehicle would be able to return to a designated loading/retrieval location. For example, if the autonomous vehicle is a delivery vehicle, the vehicle could identify the stopping location as the distribution center where the drone normally is loaded, refuels, or waits between deliveries. In the case of an autonomous vehicle used for a taxi service, the preferred stopping location could be a charging location. However, in cases where returning to a preferred stopping location is not feasible, the autonomous vehicle may need to identify an alternative stopping zone.

To identify an alternative stopping zone, the autonomous vehicle can consult a map of the area stored within memory of the autonomous vehicle, where possible stopping/landing zones 304 have been pre-designated. Based on the configuration of the autonomous vehicle, that stored map may be in a secondary navigation system (rather than the primary navigation system). In the example illustrated in FIG. 3, the processor can compare the landing zones 304 nearby with the current location 302 of the autonomous vehicle, then identify, based on captured images, objects 306, 308 which make a planned route 310 near those objects impossible. The processor can then plan an alternative route to the stopping zone 304, avoiding those areas which, based on real-time imagery, should be avoided.

Figure 4:
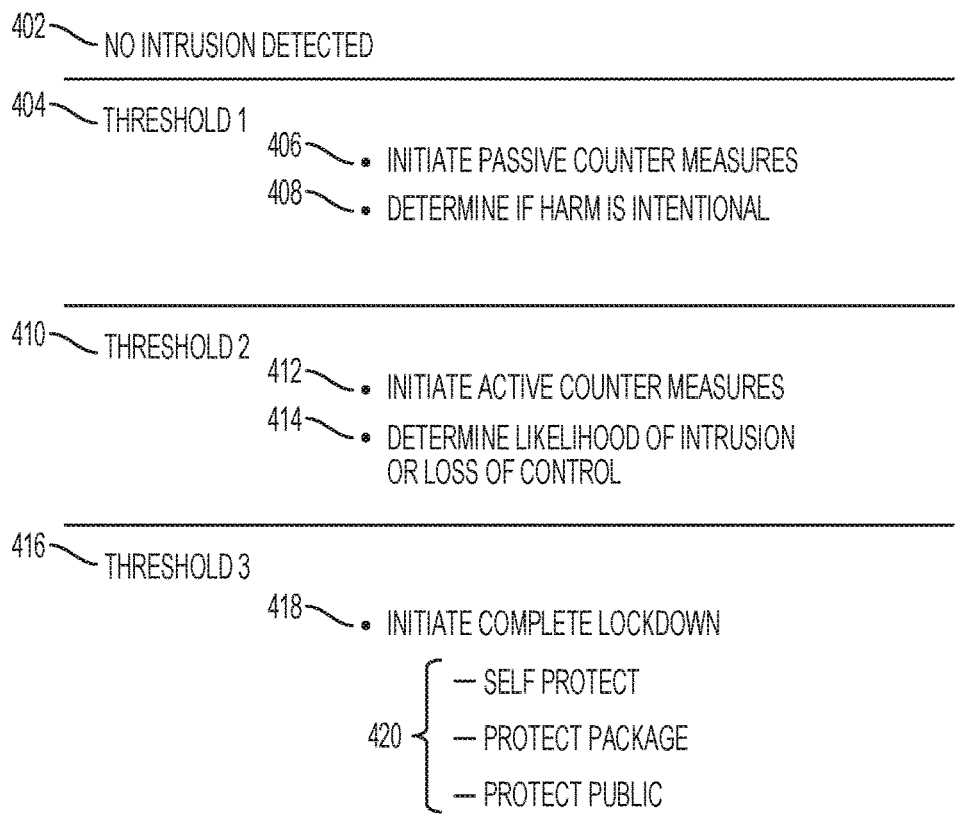
FIG. 4 illustrates exemplary thresholds at which distinct counter-measures are deployed.

FIG. 4 illustrates exemplary thresholds at which distinct counter-measures are deployed. At a first level 402, no intrusions/threats have been detected and the autonomous vehicle is operating as intended. When a detected threat meets a first threshold 404, the autonomous vehicle can initiate passive counter-measures 406 and begin analyzing if the threat is intentional 408 or otherwise directed specifically at the autonomous vehicle. Passive counter-measures can include, for example, changing the communication channel being used, the encryption associated with the communications, altering course to avoid the threat, or other procedures which would not affect other entities.

In some embodiments, hacking attempts may have certain characteristics, such as a particular error rate, signal strength, or type of packet. And within these types there may be changes in the signal qualities, such as data rate, frequency, channel, etc. These qualities can be evaluated to detect hacking attempts. If a threat is detected, the system may change its operating characteristics. For example, if the attack is made using cellular signals, the data processing capabilities may be lowered for a period of time in order to impede the attack. Attacks sending a particular type of command may result in that command being ignored. Different communication profiles may be set up and agreed upon in advance so that when an attack is detected, sender and receiver can switch to the agreed communication profile. The profile may include encryption keys, priorities, etc. to be used for communication.

When the threat detected is determined to be harmful, or otherwise reaches a next threshold 410, the autonomous vehicle can initiate active counter-measures 412, such as flares, jamming the communications of the entity threatening the autonomous vehicle, requiring a time-varying token, etc. In some cases, the mode of communication can change (i.e., WiFi to RF, or LTE to Ultra-Wide Band (UWB)). The autonomous vehicle can also analyze if the threats are likely to result in intrusion and/or loss of control 414, which may raise the threat level.

When an even higher threshold 416 of threat is detected, the autonomous vehicle can initiate a complete lockdown 418, aka turtling. In this mode, the autonomous vehicle can perform activities 420 designed to protect the autonomous vehicle, protect cargo/packages within the autonomous vehicle, and/or protect the public. These activities (such as system isolation) can remain in place until a predetermined period of time transpires, or until a predetermined condition is met. Upon the conditions being met, the threat level can be reduced (i.e., move from threshold 3 416 to threshold 2 410, or all the way to no threats detected 402).

While the specific counter-measures can vary based on circumstance or configuration, exemplary physical counter-measures can include: activating alarms, lights, and/or other security-awareness counter-measures; seek sanctuary by stopping in a safe stopping zone; change travel plans to avoid a threat; determine if a package should be dropped/ejected rather than perform a risky landing; determine if a mission should be cancelled versus losing a package; change communication channels (e.g., change from WiFi to cellular to wide-band to narrow-band); require additional authentication or communication encryption; change to an analog system (such as an analog navigation system, analog lightning arrestor, and/or analog circuit breaker).

Figure 5:
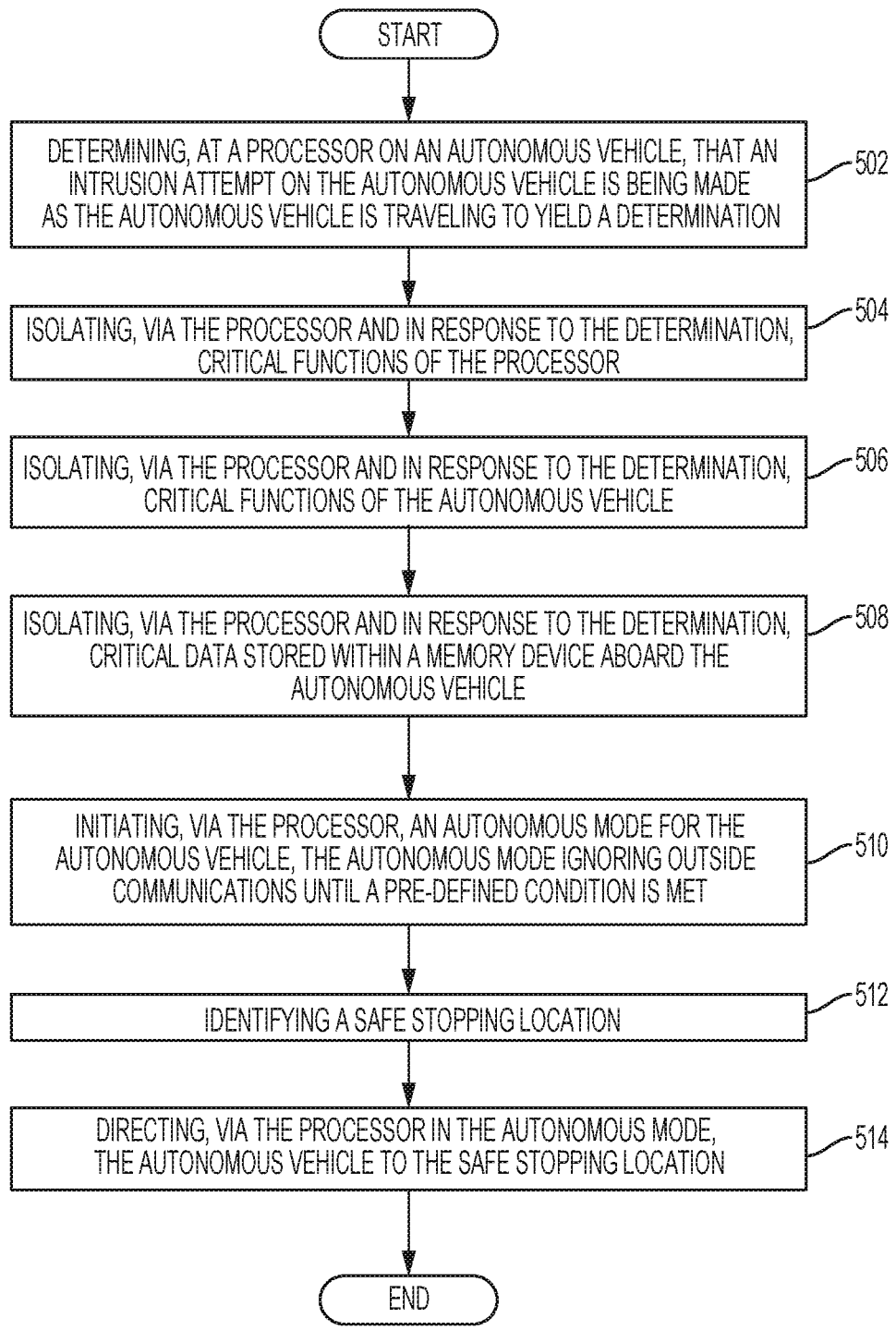
FIG. 5 illustrates an example method embodiment.

FIG. 5 illustrates an example method embodiment which can be performed by an autonomous vehicle configured according to the principles disclosed herein. The exemplary method includes determining, at a processor on an autonomous vehicle, that an intrusion attempt on the autonomous vehicle is being made as the autonomous vehicle is traveling, to yield a determination (502). The autonomous vehicle isolates, via the processor and in response to the determination, critical functions of the processor (504) and isolates, via the processor and in response to the determination, critical functions of the autonomous vehicle (506). The autonomous vehicle also isolates, via the processor and in response to the determination, critical data stored within a memory device aboard the autonomous vehicle (508). The autonomous vehicle initiates, via the processor, an autonomous mode for the autonomous vehicle, the autonomous mode ignoring outside communications until a pre-defined condition is met (510), and identifies a safe stopping location (512). The autonomous vehicle then directs itself, via the processor in the autonomous mode, to the safe stopping location (514).

In some configurations, the illustrated method can be further augmented with regard to identifying the safe stopping location by: identifying a current location of the autonomous vehicle; identifying a route back to a pre-defined stop zone; determining movement of the autonomous vehicle via the route back to the pre-defined stop zone is not compliant with a current status of the autonomous vehicle; identifying, within a geographic radius of the current location of the autonomous vehicle, features which are not conducive with a stop location; and selecting the safe stopping location based on avoiding the features which are not conducive.

In some configurations, the method illustrated can also include: identifying a geographic source of the intrusion attempt; adding the geographic source to a map of threats, to yield an updated map; and utilizing the updated map to plan a future route of the autonomous vehicle. Such configurations may, in some cases, also include transmitting, to the geographic source from the autonomous vehicle, false information, the false information having a false destination of the autonomous vehicle. The map of threats can be a four-dimensional map (cardinal directions+time).

In some configurations, the autonomous vehicle can deploy, in response to the threat, a sacrificial drone having an electromagnetic signature identical to the autonomous vehicle. Likewise, in some configurations, the code and/or algorithms used to direct the autonomous vehicle can be modified based on a specific intrusion attempt or other threat.

Figure 6:
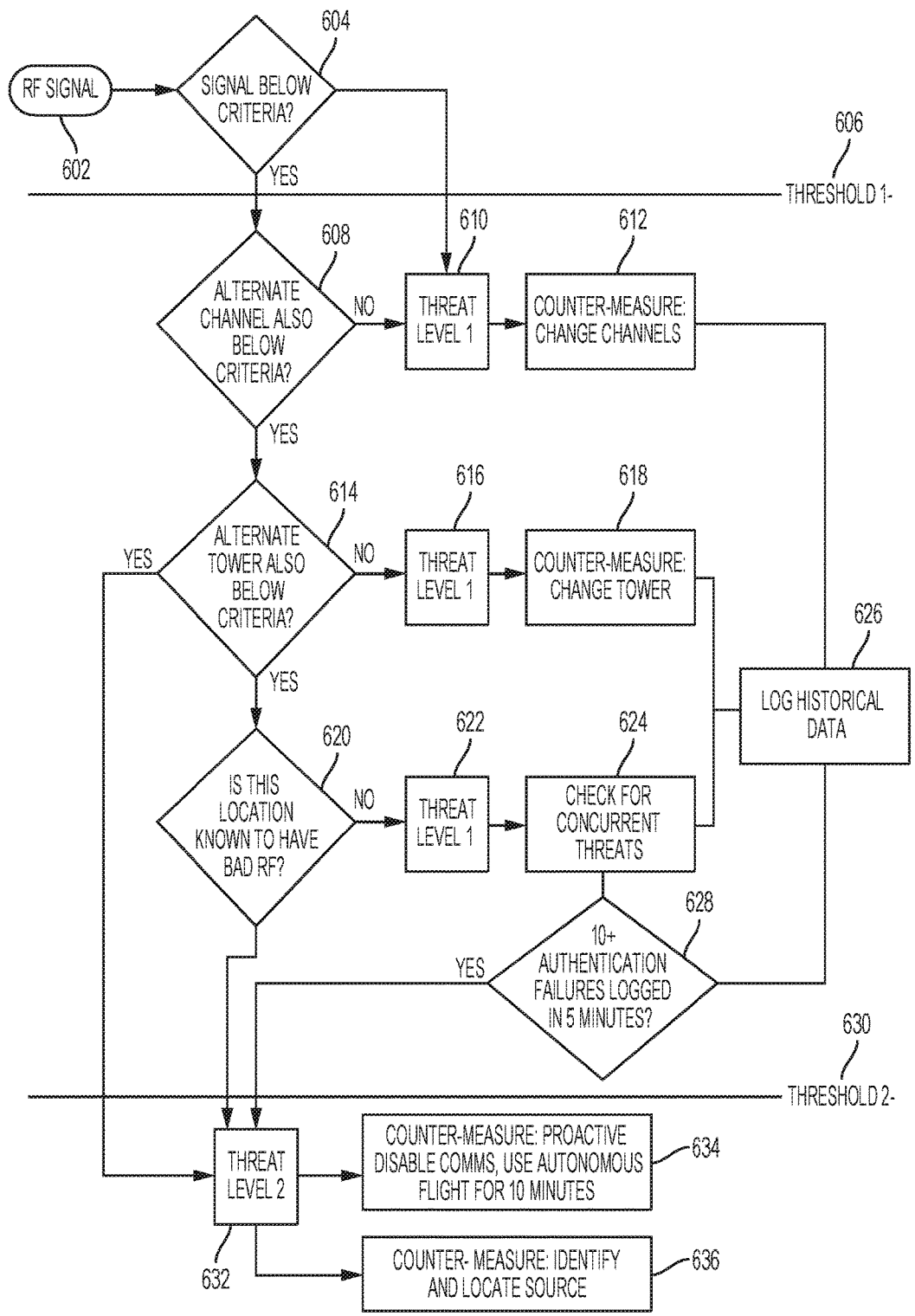
FIG. 6 illustrates an example flowchart of counter-measure deployment.

FIG. 6 illustrates an example flowchart of counter-measure deployment. In this example, the autonomous vehicle receives an RF signal 602 and determines that the signal is not below a criteria 604. As illustrated in this example, the criteria is "threshold 1" 606. The system can then raise the threat level to "threat level 1" 610. The system can also determine if an alternate channel is also above the criteria 608 threshold, and based on that determination can similarly raise the threat level. Based on signals being received 602, 608 which are above the threshold 606, the response to the "threat level 1" can be a counter-measure to change the channel 612, then log the data as historical data 626.

When the alternative channel is below the threshold 608, the counter-measure deployed can be to switch to an alternate tower. At that point, if the alternate tower is above the threshold the threat level 616 can be raised, and the change of the tower 618 can be logged in the historical data 626. Continuing forward, if the alternative tower results in a threat also below the threshold 614, the system can determine (based on historical records) if this location is known to have bad RF signals 620. If not, the threat level can again go to "threat level 1," 622, and the system can check for concurrent threats 624. This information can again be recorded in the historical data 626. If sufficient threats are recorded within a window (such as ten or more threats in a five minute window 628), or based on the system's analysis of the tower change 614 or location information 620, the threat level can be increased to "threat level 2" 632. In other words, the threat detected (whether from changing towers 614 or identifying a location with known threats 620) has a threat above a second threshold 630.

Raising the threat level to "threat level 2" 632 can result in distinct counter-measures, such as proactive disabling of communications and/or a short autonomous journey to a stopping location 634. The system can also seek to identify and locate the source of the threatening communication 636.

Figure 7:
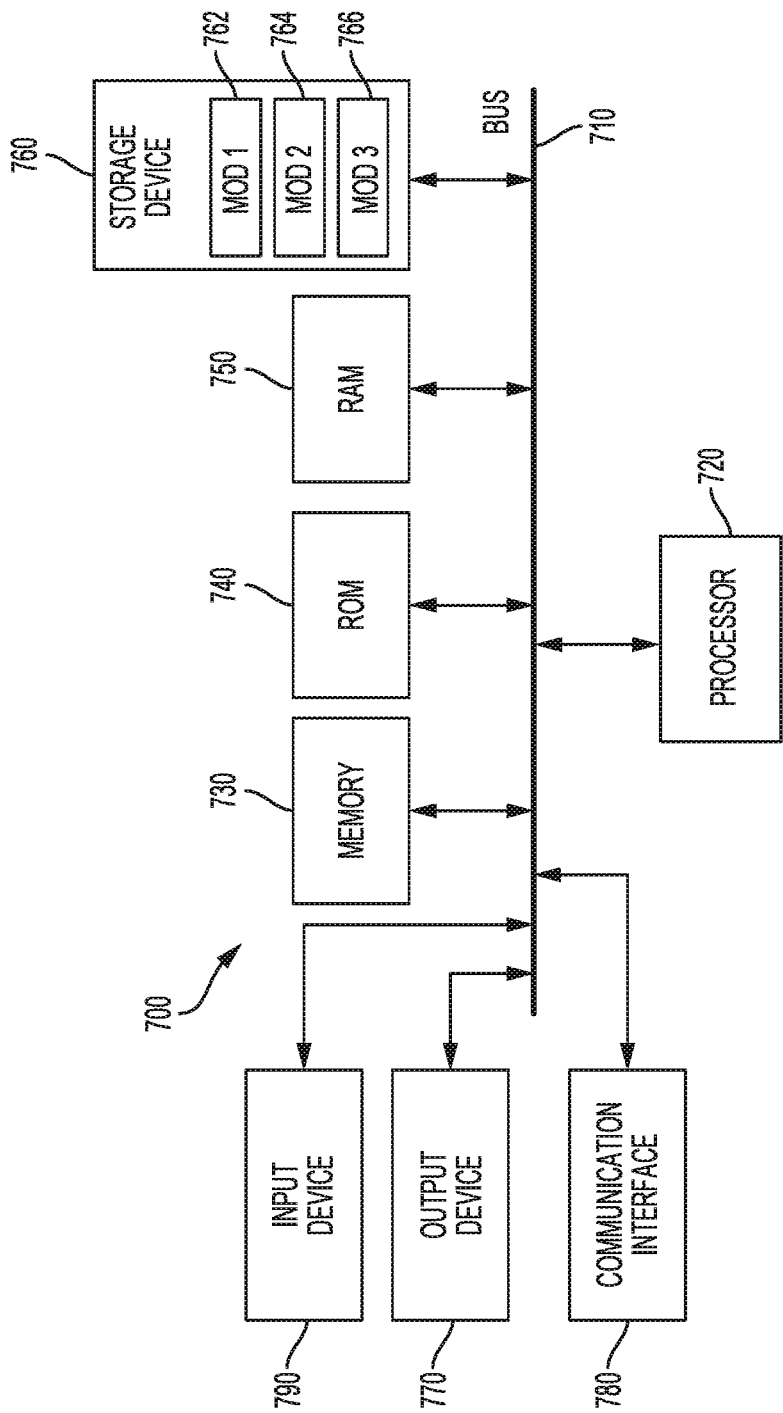
FIG. 7 illustrates an example computer system.

With reference to FIG. 7, an exemplary system includes a general-purpose computing device 700, including a processing unit (CPU or processor) 720 and a system bus 710 that couples various system components including the system memory 730 such as read only memory (ROM) 740 and random access memory (RAM) 750 to the processor 720. The system 700 can include a cache of high speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   determining, at a processor on an autonomous vehicle, that an intrusion attempt on the autonomous vehicle is being made as the autonomous vehicle is traveling, to yield a determination;
   isolating, via the processor and in response to the determination, critical functions of the processor;
   isolating, via the processor and in response to the determination, critical functions of the autonomous vehicle;
   isolating, via the processor and in response to the determination, critical data stored within a memory device aboard the autonomous vehicle;
   initiating, via the processor, an autonomous mode for the autonomous vehicle, the autonomous mode ignoring outside communications until a pre-defined condition is met;
   identifying a safe stopping location, including identifying a current location of the autonomous vehicle;
   identifying a route back to a pre-defined stop zone;
   determining movement of the autonomous vehicle via the route back to the pre-defined stop zone is not compliant with a current status of the autonomous vehicle;
   identifying, within a geographic radius of the current location of the autonomous vehicle, features which are not conducive with a stop location;
   selecting the safe stopping location based on avoiding the features which are not conducive; and
   directing, via the processor in the autonomous mode, the autonomous vehicle to the safe stopping location.

2. The method of claim 1, further comprising:
   identifying a geographic source of the intrusion attempt;
   adding the geographic source to a map of threats, to yield an updated map; and
   utilizing the updated map to plan a future route of the autonomous vehicle.

3. The method of claim 2, further comprising:
   transmitting, to the geographic source from the autonomous vehicle, false information, the false information having a false destination of the autonomous vehicle.

4. The method of claim 2, wherein the map of threats is a four-dimensional map.

5. The method of claim 1, further comprising:
   deploying, from the autonomous vehicle, a sacrificial drone having an electromagnetic signature identical to the autonomous vehicle.

6. The method of claim 1, further comprising:
   modifying code for the autonomous mode based on the intrusion attempt.

7. An autonomous vehicle, comprising:
   a processor;
   a computer-readable storage medium having instructions stored which, when executed by the processor, cause the processor to perform operations comprising:
      determining that an intrusion attempt on the autonomous vehicle is being made as the autonomous vehicle is traveling, to yield a determination;
      isolating, in response to the determination, critical functions of the autonomous vehicle;
      initiating an autonomous mode for the autonomous vehicle, the autonomous mode ignoring outside communications until a pre-defined condition is met;
   identifying a safe stopping zone, including identifying a current location of the autonomous vehicle;
   identifying a route back to a pre-defined stopping zone;
   determining movement of the autonomous vehicle via the route back to the pre-defined stopping zone is not compliant with a current status of the autonomous vehicle;
   identifying, within a geographic radius of the current location of the autonomous vehicle, features which are not conducive with a stopping location;
   selecting the safe stopping zone based on avoiding the features which are not conducive; and
      directing, while in the autonomous mode, the autonomous vehicle to the safe stopping zone.

8. The autonomous vehicle of claim 7, the computer-readable storage medium having additional instructions stored which, when executed by the processor, cause the processor to perform operations comprising:
   identifying a geographic source of the intrusion attempt;
   adding the geographic source to a map of threats, to yield an updated map; and
   utilizing the updated map to plan a future route of the autonomous vehicle.

9. The autonomous vehicle of claim 8, the computer-readable storage medium having additional instructions stored which, when executed by the processor, cause the processor to perform operations comprising:
   transmitting, to the geographic source from the autonomous vehicle, false information, the false information having a false destination of the autonomous vehicle.

10. The autonomous vehicle of claim 8, wherein the map of threats is a four-dimensional map.

11. The autonomous vehicle of claim 7, the computer-readable storage medium having additional instructions stored which, when executed by the processor, cause the processor to perform operations comprising:
    deploying, from the autonomous vehicle, a sacrificial drone having an electromagnetic signature identical to the autonomous vehicle.

12. The autonomous vehicle of claim 7, the computer-readable storage medium having additional instructions stored which, when executed by the processor, cause the processor to perform operations comprising:
    modifying code for the autonomous mode based on the intrusion attempt.

13. A non-transitory computer-readable storage medium having instructions which, when executed by a computing device, causes the computing device to perform operations comprising:

determining that an intrusion attempt on an autonomous vehicle is being made as the autonomous vehicle is traveling, to yield a determination;

isolating, in response to the determination, critical functions of the autonomous vehicle;

initiating an autonomous mode for the autonomous vehicle, the autonomous mode ignoring outside communications until a pre-defined condition is met;

identifying a safe stopping zone;

directing, while in the autonomous mode, the autonomous vehicle to the safe stopping zone, identifying a geographic source of the intrusion attempt;

adding the geographic source to a map of threats, to yield an updated map; and utilizing the updated map to plan a future route of the autonomous vehicle.

14. The non-transitory computer-readable storage medium of claim 13, wherein the identifying of the safe stopping zone further comprises:

identifying a current location of the autonomous vehicle;

identifying a route back to a pre-defined stopping zone;

determining movement of the autonomous vehicle via the route back to the pre-defined stopping zone is not compliant with a current status of the autonomous vehicle;

identifying, within a geographic radius of the current location of the autonomous vehicle, features which are not conducive with a stopping location; and selecting the safe stopping zone based on avoiding the features which are not conducive.

15. The non-transitory computer-readable storage medium of claim 14, having additional instructions stored which, when executed by the computing device, cause the computing device to perform operations comprising:

transmitting, to the geographic source from the autonomous vehicle, false information, the false information having a false destination of the autonomous vehicle.

16. The non-transitory computer-readable storage medium of claim 14, wherein the map of threats is a four-dimensional map.

17. The non-transitory computer-readable storage medium of claim 13, having additional instructions stored which, when executed by the computing device, cause the computing device to perform operations comprising:

deploying, from the autonomous vehicle, a sacrificial drone having an electromagnetic signature identical to the autonomous vehicle.

\* \* \* \* \*